United States Patent [19]

Laughner

[11] Patent Number: 4,929,676

[45] Date of Patent: May 29, 1990

[54] IMPACT AND CHEMICAL RESISTANT POLYCARBONATE BLEND

[75] Inventor: Michael K. Laughner, Lake Jackson, Tex.

[73] Assignee: The Dow Chemical Company, Midland, Mich.

[21] Appl. No.: 342,145

[22] Filed: Apr. 24, 1989

[51] Int. Cl.$^5$ ............................................. C08L 69/00
[52] U.S. Cl. ...................................... 525/67; 525/404; 525/408
[58] Field of Search ................. 525/67, 146, 408, 404, 525/74, 439, 902

[56] References Cited

U.S. PATENT DOCUMENTS 4,536,542  8/1985  Allen ...................................... 525/67

Primary Examiner—Theodore E. Pertilla
Attorney, Agent, or Firm—Douglas N. Deline

[57] ABSTRACT

Impact resistant polycarbonate blends, which may be extruded without pre-drying, are prepared from an aromatic polycarbonate, an aromatic polyester, a carbon monoxide polymer and a polyalkyleneoxide rubber, and optionally, a grafted copolymer or mixture of grafted copolymers.

20 Claims, No Drawings

IMPACT AND CHEMICAL RESISTANT POLYCARBONATE BLEND

FIELD OF THE INVENTION

This invention relates generally to polycarbonates, and more particularly, to impact resistant polymer blends containing a polycarbonate, a polyester, a carbon monoxide copolymer and a polyalkyleneoxide rubber; and optionally, a grafted copolymer or mixture of grafted copolymers. The polycarbonate blends of the present invention are additionally unique in that the blend and its components may be mixed without pre-drying, and yet the excellent physical and mechanical properties of the as-extruded product are preserved.

BACKGROUND OF THE INVENTION

Polycarbonates are well-known commercially available resinous materials having a variety of applications. They are typically prepared by the reaction of dihydroxy compounds with a carbonate precursor, such as phosgene, in the presence of a catalyst. Methods of direct phosgenation, interfacial condensation and transesterification, for the preparation of polycarbonates, are described in detail in "The Chemistry and Physics of Polycarbonates", by H. Schnell, John Wiley & Co., N.Y., 1964.

Polycarbonates are high temperature, high performance engineering thermoplastics having a combination of good thermal and mechanical properties, especially when prepared from one or more aromatic diols. The blending with polycarbonates of additional compounds, such as for example, other thermoplastic resins, copolymer rubber compounds, and the like, is commonly practiced in order to improve one or more properties of the homopolymer polycarbonate.

A blend of polycarbonate, polyester, and a third impact modifying component is known. U.S. Pat. Nos. 4,257,937 and 4,677,148 disclose the use of acrylate and other rubber-containing impact modifiers in blends of polycarbonate and polyester. U.S. Pat. Nos. 4,180,494 and 4,654,400 disclose the incorporation of acrylate or butadiene based core-shell copolymers as impact modifiers for polycarbonate/polyester blends. These references do not, however, suggest the incorporation of a polyalkyleneoxide rubber.

U.S. Pat. No. 4,221,889 discloses a copolymer of a divinyl polyester and a polymerizable monomer, such as styrene, additionally containing as a toughener a polyepihalohydrin or copolymer of epihalohydrin and a monomer having an epoxide group. During polymerization of the epihalohydrin, the epoxide group opens, forming a polymer chain containing ether oxygen atoms in its backbone. The reference does not teach the toughening of a homopolymer polyester by the addition of polyepihalohydrin. It likewise does not suggest that the polyepihalohydrin might eliminate the usual requirement of drying the blend prior to extrusion, since the resinous blends disclosed in the reference are liquid when molded.

U.S. Pat. No. 4,444,950 discloses a blend of a polycarbonate, a rubber modified copolymer such as an ABS rubber, and a third component copolymer comprising an unsaturated epoxide-containing monomer and an olefin. The third component is polymerized through the double bonds on both the epoxide-containing monomer and the olefin, thereby resulting in a polymer chain having pendant epoxide groups and no ether linkages in its backbone.

U.S. Pat. No. 3,780,139 and 4,271,063 disclose polymers of ethylene, carbon monoxide and a third component such as vinyl acetate.

Finally, U.S. Pat. No. 4,554,315 discloses a blend of a polycarbonate, a polyester, a graft copolymer, and a polymeric modifier prepared from an olefinically unsaturated monomer having at least one epoxide group. This polymeric modifier likewise polymerizes through the olefinic unsaturated site, resulting in a polymer chain having pendant epoxide groups and no ether linkages in its backbone.

SUMMARY OF THE INVENTION

The present invention is directed toward a novel impact resistant and chemically resistant polycarbonate blend, which additionally does not require pre-drying of either the blend components nor the blend itself in order to preserve good mechanical properties, comprising an aromatic polycarbonate, an aromatic polyester, a carbon monoxide polymer and a polyalkyleneoxide rubber having a $T_g$ lower than 0° C. The polyalkyleneoxide rubber component of the present invention does not contain pendant epoxide groups; it is essentially a linear polyether formed by the opening of the epoxide group of the alkylene oxide monomer during polymerization. The polymer blend may optionally contain a grafted copolymer or a mixture of grafted copolymers. The blend surprisingly is highly impact resistant, and chemically resistant, having an especially high notched Izod impact resistance in thick sections, and does not require the usual process step of drying prior to extrusion.

The polycarbonate blends of the present invention exhibit high impact resistance, chemical resistance, temperature stability, and excellent thermoplastic engineering properties, making them particularly suitable for producing molded plastic components.

DETAILED DESCRIPTION

The aromatic polycarbonates suitable for use in the present invention are produced by any of the conventional processes known in the art for the manufacture of polycarbonates. Generally, aromatic polycarbonates are prepared by reacting one or more aromatic dihydric phenols with a carbonate precursor, such as for example phosgene, a haloformate or a carbonate ester.

A preferred method for preparing the aromatic polycarbonates suitable for use in the present invention involves the use of a carbonyl halide, such as phosgene, as the carbonate precursor. This method involves passing phosgene gas into a reaction mixture containing one or more activated dihydric phenols, or, in the case of non-activated dihydric phenols, also including an acid acceptor, such as for example pyridine, dimethyl aniline, quinoline and the like. The acid acceptor may be used undiluted or diluted with inert organic solvents, such as methylene chloride, chlorobenzene or 1,2-dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature to 50° C. Since the reaction is exothermic, the rate of phosgene addition may be used to control the temperature of the reaction. The amount of phosgene required will generally depend upon the amount of dihydric phenols present. Generally speaking, one mole of phosgene will react with one mole of dihydric phenol to form the polycarbonate and two moles of HCl. The HCl is in turn taken up by the acid acceptor.

Another method for preparing the aromatic polycarbonates useful in the present invention comprises adding phosgene to an alkaline aqueous suspension of dihydric phenols. This is preferably done in the presence of inert solvents such as methylene chloride, 1,2-dichloroethane and the like. Quaternary ammonium compounds may be employed to catalyze the reaction.

Yet another method for preparing such aromatic polycarbonates involves the phosgenation of an agitated suspension of the anhydrous alkali salts of aryl diols in a nonaqueous medium such as benzene, chlorobenzene or toluene. The reaction is illustrated by the addition of phosgene to a slurry of the sodium salt of, for example, Bisphenol A in an inert polymer solvent such as chlorobenzene. The organic solvent should preferably be a polymer solvent.

Generally speaking, a haloformate such as the bishaloformate of Bisphenol A may be used in place of phosgene as the carbonate precursor in any of the methods described above.

When a carbonate ester is used as the carbonate precursor in the polycarbonate forming reaction, the materials are reacted at temperatures in excess of 100° C., for times varying from 1 to 15 hours. Under such conditions, ester interchange occurs between the carbonate ester and the dihydric phenol used. The ester interchange is advantageously consummated at reduced pressures on the order of from about 10 to about 100 millimeters of mercury, preferably in an inert atmosphere such as nitrogen or argon.

Although the polymer forming reaction may be conducted in the absence of a catalyst, one may, if desired, employ a typical ester exchange catalyst, such as metallic lithium, potassium, calcium or magnesium. The amount of such catalyst, if used, is usually small, ranging from about 0.001 percent to about 0.1 percent, based on the weight of the dihydric phenols employed.

In the solution methods of preparation, the aromatic polycarbonate emerges from the reaction in either a true or pseudo solution depending on whether an aqueous base or pyridine is used as an acid acceptor. The copolymer may be precipitated from the solution by adding a polymer nonsolvent, such as heptane or isopropanol. Alternatively, the polymer solution may be heated, typically under reduced pressure, to evaporate the solvent.

A preferred aromatic polycarbonate is characterized by repeated units corresponding to the general formula:

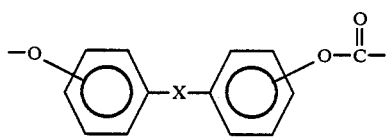

wherein X is a divalent $C_1$–$C_{15}$ hydrocarbon radical, a single bond, —O—, —S—, —$S_2$—, —SO—, —$SO_2$—, or —CO—. Each aromatic ring may additionally contain 1 or 2 substituents such as $C_1$–$C_4$ hydrocarbon radicals or halo radicals. A most preferred aromatic polycarbonate is prepared form 2,2-bis-(4-hydroxyphenyl)-propane (Bisphenol A).

The aforementioned methods of preparing aromatic polycarbonates are more fully set forth in U.S. Pat. Nos. 2,999,846, 3,028,365, 3,148,172, 3,153,008, 3,248,414, 3,271,367, and 4,452,968, which are hereby incorporated by reference thereto.

By the term aromatic polycarbonate, as used in the present invention, is also contemplated aromatic carbonate-siloxane block copolymers whose structure and method of preparation are taught in U.S. Pat. Nos. 4,569,970 and 4,657,898 which are incorporated herein in their entirety by reference thereto, as well as mixtures of polycarbonates and aromatic carbonate-siloxane block copolymers.

Also included in the term aromatic polycarbonate are the polycarbonate/polyester copolymers of the types disclosed in U.S. Pat. Nos. 3,169,121, 4,105,633, 4,156,069, 4,260,731 and 4,287,787 which are incorporated herein in their entirety by reference thereto, as well as mixtures of polycarbonates and polycarbonate/polyester copolymers.

The aromatic polyesters suitable for use, according to the present invention, are generally prepared by condensing aromatic dicarboxylic acids with diols. Suitable dicarboxylic acids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid, and the like. The diols suitable for preparation of the aromatic polyesters include, for example, ethylene glycol, 1,3-propylene glycol, 1,4-butanediol, 1,5-pentanediol, 1,6-hexanediol, cyclohexane dimethylol, and the like.

A preferred polyester is characterized by repeated units corresponding to the general formula:

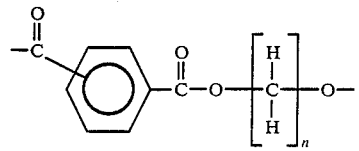

wherein n is selected from the numbers 2 through 6. A most preferred aromatic polyester is polyethylene terephthalate.

By the term polyester, as used in the present invention, is also contemplated copolyesters, which may be prepared by cocondensing one or more aromatic dicarboxylic acids with one or more diols.

Specific methods of preparing aromatic polyesters and copolyesters are more fully set forth in U.S. Pat. Nos. 2,465,319 and 3,047,539, which are hereby incorporated in their entirety by reference thereto.

The carbon monoxide polymers include copolymers of one or more ethylenically unsaturated monomers especially α-olefins such as ethylene with carbon monoxide. Preferred carbon monoxide copolymers comprise from 1 to 25 percent by weight, preferably 2 to 20 percent by weight carbon monoxide. Also included are carbon monoxide graft copolymers, for example copolymers prepared by grafting a mixture of carbon monoxide and ethylene onto a polyethylene substrate. Techniques for the preparation of carbon monoxide polymers are well known in the art having been previously taught in U.S. Pat. Nos. 3,248,359 and 4,143,096, the teachings of which are incorporated herein in their entirety by reference thereto.

The polyalkyleneoxide rubbers suitable for practicing the present invention are prepared by polymerizing alkylene oxides containing two or more carbon atoms. Alternatively, the aforementioned alkylene oxides may be copolymerized with each other, or with epoxide-containing monomers. Polyalkyleneoxide rubbers are characterized in that they have rubber-like properties; e.g., high yield under stress, good elastic recovery, and a glass transition temperature lower than 0° C.

Alkylene oxide monomers containing at least two carbon atoms, suitable for preparing the polyalkyleneoxide rubbers of the present invention, correspond to the general formula:

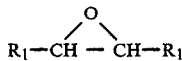    III wherein each $R_1$ is independently a $C_1$-$C_{10}$ alkyl or alkylene, or halo substituted alkyl or alkylene hydrocarbon radical, or hydrogen atom. These monomers are unique in that they polymerize to produce essentially linear polyethers: polymerization having occurred through the epoxide group.

Examples of alkylene oxide monomers include, but are not limited to, propylene oxide, butene-1 oxide, butylene oxide, cis- and trans-butene-2 oxides, hexane-1 oxide, hexane-2 oxide, dodecene-1 oxide, epichlorohydrin, trichlorobutylene oxide and the like. Additionally, mixtures of alkylene oxides, or alkylene oxides plus other oxides such as for example styrene oxide, may be used to prepare copolymers, terpolymers, etc. The polymerization of alkylene oxides may be promoted by contacting the monomers in the presence of an organo-metallic catalyst, such as for example triethylaluminum, at a temperature of about −30° C. to about 150° C. (see U.S. Pat. No. 3,728,321, incorporated herein by reference thereto). A preferred alkylene oxide monomer is propylene oxide.

Epoxide-containing monomers, suitable for copolymerizing with alkylene oxide monomers to prepare the polyalkyleneoxide rubbers of the present invention, correspond to the general formula:

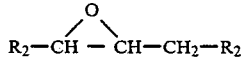    IV wherein each $R_2$ is independently hydrogen, or a $C_1$-$C_{10}$ alkyl, alkenyl, alkoxy alkyl or alkoxy carbonyl radical, or halo substituted alkyl, alkenyl, alkoxy alkyl or alkoxy carbonyl radical. Where the epoxide-containing monomer contains ethylenic unsaturation, the resultant polyalkyleneoxide rubber may subsequently be crosslinked.

Copolymerization, involving epoxide-containing monomers, likewise occurs through the epoxide group; therefore, no pendant epoxide groups remain in the resultant polyalkyleneoxide rubber copolymer. Examples of epoxide-containing monomers include, but are not limited to, glycidyl ethers, such as methyl glycidyl ether, ethyl glycidyl ether and isopropyl glycidyl ether; also glycidyl acrylate, glycidyl methacrylate, epichlorohydrin, trichlorobutylene oxide, and allyl glycidyl ether. Copolymerization between the alkylene oxide monomers having at least two carbon atoms and the epoxide-containing monomers may be effected by contacting the monomers in the presence of an organo-metallic catalyst such as triethylaluminum at a temperature of about −30° C. to about 150° C. A preferred epoxide-containing monomer is allyl glycidyl ether.

The amount of epoxide-containing monomers that may be copolymerized with the alkylene oxide monomers will vary, depending upon the nature of the monomers. Generally, the alkylene oxide monomers should comprise about 50 percent to about 100 percent of the polyalkyleneoxide rubber; preferably about 70 percent to about 100 percent. The allowable proportion of each monomer will generally be that amount required to give good rubbery physical properties, e.g., having a Tg lower than 0° C. Polyalkyleneoxide rubbers containing pendant ethylenically unsaturated groups, prepared by copolymerizing alkylene oxide monomers with epoxide-containing monomers having ethylenic unsaturation, may subsequently be vulcanized by known methods.

A preferred polyalkyleneoxide rubber is a copolymer of propylene oxide and allyl glycidyl ether, sold by B. F. Goodrich under the trademark PAREL ® 58.

The polycarbonate blends of the present invention may optionally contain a grafted copolymer or a mixture of grafted copolymers. Such copolymers generally have a Tg below about 0° C. and are introduced into the polymer matrix so as to result in a substantially uniform distribution in the blend of polycarbonate, polyester and polyalkyleneoxide rubber.

The grafted copolymers of the present invention are generally characterized as having a core-shell structure, typically prepared by means of an emulsion polymerization process, or a core-matrix structure, typically prepared by a mass polymerization process. The grafted copolymers of the present invention generally comprise about 5 percent to 95 percent by weight of an elastomeric rubber core, and about 95 percent to about 5 percent by weight of either a rigid grafted-on thermoplastic polymer shell in the case of a core-shell copolymer, or a grafted-on thermoplastic polymer matrix in the case of a core-matrix copolymer. Examples of suitable grafted copolymers of the core-shell type are a methylmethacrylate/butadiene/styrene grafted copolymer (MBS rubber), and a butyl acrylate core-rigid thermoplastic shell copolymer. An example of a suitable grafted copolymer of the core-matrix type is an acrylonitrile/butadiene/styrene grafted copolymer (ABS copolymer).

The preferred grafted copolymers are generally obtained by polymerizing certain monomers in the presence of an acrylate or diene rubber core. By the term diene rubber is meant homopolymers of conjugated dienes have 4 to 8 carbon atoms such as butadiene, isoprene, piperylene, chloroprene, and copolymers of such dienes with other monomers, such as for example, acrylonitrile, methacrylonitrile, butyl acrylate, methyl methacrylate, styrene, α-methylstyrene, and the like. The rubber core may be at least partially crosslinked, or may contain thermoplastic polymer inclusions such as for example when mass polymerization is used to prepare the grafted copolymer. The aforementioned certain monomers are grafted onto the rubber core to form either the shell or matrix. At least one of these monomers is selected from the group including styrene and its derivatives, such as for example α-methylstyrene, acrylic acids, methacrylic acids, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, maleic anhydride and the like. Preferred grafted copolymers are MBS rubbers, butyl acrylate core-rigid shell copolymers, ABS copolymers, and butadiene/-styrene/acrylonitrile core-shell type copolymers.

Methods for preparing the grafted copolymers for use in the present invention are the known mass or emulsion polymerization processes as disclosed in U.S. Pat. Nos. 3,509,237, 3,660,535, 3,243,481, 4,221,833, 4,617,345 and 4,239,863, which are incorporated herein in their entirety by reference thereto.

It must be noted that a blend consisting solely of an aromatic polycarbonate, an aromatic polyester, the carbon monoxide polymer and a grafted copolymer or mixture of grafted copolymers (i.e., a blend not containing a polyalkyleneoxide rubber) does not exhibit the advantageous characteristics of the present invention. The aforementioned blend and/or its components must be dried prior to extrusion in order to preserve its good mechanical properties. By contrast, the present invention eliminates the need for pre-drying the components or the blend prior to extrusion.

The polycarbonate blend of the present invention comprises about 5 percent to about 95 percent, preferably about 40 percent to about 85 percent, of an aromatic polycarbonate, about 90 percent to about 5 percent, preferably about 60 percent to about 15 percent, of an aromatic polyester, from 1 percent to 30 percent, preferably 2 percent to 20 percent of the carbon monoxide polymer and about 0.1 to about 20 percent, preferably about 1 percent to about 10 percent of a polyalkyleneoxide rubber. The blend may optionally contain up to about 40 percent, preferably up to about 30 percent of a grafted copolymer or mixture of grafted copolymers. The recited percentages are in relation to the total weight of the resinous blend. The components may be mixed in any order, by the use of any conventional mixing apparatus, then immediately extruded, thereby bypassing the usually required step of drying the components or the blend prior to extrusion. The inclusion of the polyalkyleneoxide rubber obviates the drying step, while producing a blended resin having superior physical properties. As-extruded, the blend has good chemical resistance and reduced notched Izod impact sensitivity, especially in thick sections. As is well recognized in the art, similar blends not containing a polyalkyleneoxide rubber require a drying step prior to extrusion if the mechanical properties are to be preserved.

The polycarbonate blends of the present invention may furthermore contain conventional thermoplastic polymer additives, such as for example, fillers, thermal stabilizers, dyes, flame retarding agents, reinforcing agents, softeners, mold-release agents, seed-forming agents, pigments, plasticizers, antistatic agents, ultraviolet ray absorbers, lubricants, and the like.

The invention is more easily comprehended by reference to specific embodiments which are representative of the invention. It must be understood, however, the the specific embodiments are provided only for the purposes of illustration and understanding, and that the invention may be practiced otherwise than as specifically illustrated and described without departing from its spirit and scope.

EXAMPLES 1-8

Blends containing the ingredients listed in Table I (expressed as percent by weight) were prepared by tumble mixing the components, without pre-drying, for about seven minutes. The blend components included: CALIBRE ®300-10, an aromatic polycarbonate manufactured by The Dow Chemical Company; KODAK ® 7741, a polyethylene terephthalate polyester manufactured by Kodak; VITUF ® 1006C, a polyethylene terephthalate polyester manufactured by Goodyear: PAREL ® 58, a polyalkyleneoxide rubber copolymer of propylene oxide and allyl glycidyl ether manufactured by Goodrich: PARALOID ® 3607 and 3330, MBS rubbers manufactured by Rohm & Haas: PETG ®, a terephthalic acid/ethylene glycol/cyclohexane dimethanol polyester copolymer manufactured by Kodak: epoxidized soybean oil: and IRGANOX ® 1076, a thermal antioxidant stabilizer manufactured by Ciba Geigy.

Each blend, without first being dried, was extruded in a 34 mm counter-rotating twin screw American Leistritz vented extruder. The extruded pellets were subsequently dried then injection molded into test specimens using a 75 ton Arburg molding machine.

Physical properties of the test specimens are reported in Table II. Chemical aging of the specimens was accomplished by submerging each specimen, while under a 0.5 percent strain, in a 60/40 mixture of isooctane and toluene, a synthetic gasoline.

It is apparent from the results of Table II that the invented compositions are extremely tough and highly resilient to attack by hydrocarbon solvents. The resins would accordingly be usefully employed in the manufacture of molded parts for use in automotive applications.

TABLE I

| COMPOSITIONS TESTED | | | | | |
|---|---|---|---|---|---|
| | Examples | | | | |
| | 1 | 2 | 3 | 4 | 5 |
| CALIBRE ® 300-10 polycarbonate | 74.7 | 74.7 | 64.8 | 54.8 | 59.8 |
| KODAK ® 7741 polyester | — | 10.0 | 19.9 | 29.9 | — |
| VITUF ® 1006C polyester | 11.0 | — | — | — | 19.9 |
| PETG ® | — | — | — | — | 5.0 |
| PAREL ® 58 polyalkyleneoxide rubber | 4.0 | 4.0 | 4.0 | 4.0 | 4.0 |
| PARALOID ® 3607 MBS rubber | 7.0 | 7.0 | 7.0 | 7.0 | 7.0 |
| ECO | 3.0 | 4.0 | 4.0 | 4.0 | 4.0 |
| Epoxidized Soybean Oil | 0.1 | 0.1 | 0.1 | 0.1 | 0.1 |
| IRGANOX ® 1076 antioxidant | 0.2 | 0.2 | 0.2 | 0.2 | 0.2 |

TABLE II

| | PHYSICAL TEST PROPERTIES | | | | |
|---|---|---|---|---|---|
| | Example 1 | Example 2 | Example 3 | Example 4 | Example 5 |
| Perpendicular Izod Impact, ⅛", 10 mil. notch ft-lbs/in @ 23° C. | 7.5 | 7.1 | 7.8 | 8.5 | 8.1 |

TABLE II-continued
PHYSICAL TEST PROPERTIES

| | Example 1 | Example 2 | Example 3 | Example 4 | Example 5 |
|---|---|---|---|---|---|
| @ 0° C. | 6.3 | 5.9 | 6.5 | 7.2 | 7.2 |
| Parallel Izod Impact, ⅛" thickness, 10 mil notch, ft-lbs/in @ 23° C. | 11.8 | 11.6 | 11.5 | 11.6 | 11.9 |
| @ 0° C. | 11.6 | 11.6 | 12.0 | 11.3 | 12.1 |
| @ −21° C. | 11.4 | 10.9 | 10.6 | 6.9 | 10.0 |
| Tensile at Break, psi, following 5 min @ 0.5% str. in 60/40 Iso/Tol | 7,948 | 7,230 | 7,839 | 7,316 | 7,134 |
| % Elongation at Break, following 5 min @ 0.5% str. in 60/40 Iso/Tol | 109 | 103 | 130 | 135 | 119 |

What is claimed is:

1. A thermoplastic molding composition comprising:
   A. an aromatic polycarbonate;
   B. an aromatic polyester;
   C. a copolymer of one or more ethylenically unsaturated monomers with carbon monoxide; and
   D. a polyalkylene oxide rubber having a glass transition temperature (Tg) lower than 0° C.

2. The thermoplastic molding composition of claim 1, wherein the polyalkyleneoxide rubber is prepared by polymerizing one or more alkylene oxides of the general formula:

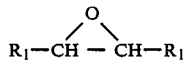

wherein each $R_1$ is independently a $C_1$-$C_{10}$ alkyl or alkylene, or halo substituted alkyl or alkylene hydrocarbon radical, or a hydrogen atom.

3. The thermoplastic molding composition of claim 2, wherein the polyalkyleneoxide rubber is prepared by further copolymerizing, with the alkylene oxides, epoxide-containing monomers of the general formula:

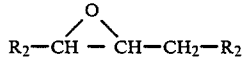

wherein each $R_2$ is independently hydrogen, or a $C_1$-$C_{10}$ alkyl, alkenyl, alkoxy alkyl or alkoxy carbonyl radical, or halo substituted alkyl, alkenyl, alkoxy alkyl or alkoxy carbonyl radical.

4. The thermoplastic molding composition of claim 1, wherein the aromatic polycarbonate is characterized at least in part by repeated units corresponding to the general formula:

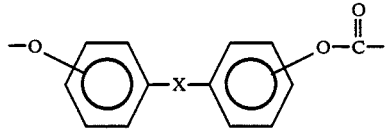

wherein X is a divalent $C_1$-$C_{15}$ hydrocarbon radical, a single bond, —O—, —S—, —S$_2$—, —SO—, —SO$_2$—, or —CO—, and further wherein each aromatic ring may optionally contain 1 or 2 $C_1$-$C_4$ hydrocarbon radical or halo radical constituents.

5. The thermoplastic molding composition of claim 4, wherein the aromatic polycarbonate is prepared at least in part from Bisphenol A.

6. The thermoplastic molding composition of claim 1, wherein the aromatic polyester is characterized at least in part by repeated units corresponding to the general formula:

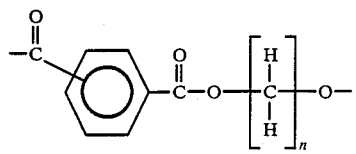

wherein n is selected from the numbers 2 through 6.

7. The thermoplastic molding composition of claim 6, wherein the aromatic polyester is at least in part polyethylene terephthalate.

8. The thermoplastic molding composition of claim 2, wherein the polyalkyleneoxide rubber is prepared at least in part from propylene oxide.

9. The thermoplastic molding composition of claim 3, wherein the polyalkyleneoxide rubber is prepared at least in part from propylene oxide, and allyl glycidyl ether.

10. The thermoplastic molding composition of claim 1 further comprising a grafted copolymer or mixture of grafted copolymers, wherein the grafted copolymer or mixture thereof comprises:
    A. about 5 percent to abut 95 percent by weight of an elastomeric rubber core; and
    B. about 5 percent to about 95 percent by weight of:
       i. a rigid grafted-on thermoplastic shell; or
       ii. a grafted-on thermoplastic polymer matrix.

11. The thermoplastic molding composition of claim 10, wherein the grafted copolymer is an MBS (methyl methacrylate/butadiene/styrene) rubber, a butyl acrylate core-rigid shell copolymer, an ABS (acrylonitrile/butadiene/styrene) copolymer, a butadiene/styrene/acrylonitrile core-shell copolymer, or a mixture thereof.

12. The thermoplastic molding composition of claim 3, wherein the polyalkyleneoxide rubber is at least in part crosslinked.

13. The thermoplastic molding composition of claim 1, wherein the aromatic polycarbonate comprises about 5 percent to about 95 percent, based upon the total weight of polymers.

14. The thermoplastic molding composition of claim 13, wherein the aromatic polycarbonate comprises about 40 percent to about 85 percent, based upon the total weight of polymers.

15. The thermoplastic molding composition of claim 1, wherein the aromatic polyester comprises about 5 percent to about 90 percent, based upon the total weight of polymers.

16. The thermoplastic molding composition of claim 15, wherein the aromatic polyester comprises about 15 percent to about 60 percent, based upon the total weight of polymers.

17. The thermoplastic molding composition of claim 1, wherein the polyalkyleneoxide rubber comprises about 0.1 percent to about 20 percent, based upon the total weight of polymers.

18. The thermoplastic molding composition of claim 17, wherein the polyalkyleneoxide rubber comprises about 1 percent to about 10 percent, based upon the total weight of polymers.

19. The thermoplastic molding composition of claim 10, wherein the grafted copolymer or mixture of grafted copolymers comprises less than about 40 percent, based upon the total weight of the polymers.

20. The thermoplastic molding composition of claim 1, wherein the carbon monoxide copolymer is a graft copolymer of carbon monoxide and one or more ethylenically unsaturated monomers onto a polyethylene substrate.

* * * * *